United States Patent [19]

Shieh

[11] Patent Number: 4,916,926

[45] Date of Patent: Apr. 17, 1990

[54] LOCKING APPARATUS

[76] Inventor: Jin R. Shieh, No. 178, Shih Chia Rd., Taichung City, Taiwan

[21] Appl. No.: 211,718

[22] Filed: Jun. 7, 1988

[51] Int. Cl.$^4$ ............................................. E05B 65/06
[52] U.S. Cl. ............................ 70/135; 292/DIG. 17;
  16/337; 16/354; 70/223; 70/380
[58] Field of Search .................... 70/360, 379 R, 380,
  70/222, 223, 135; 292/DIG. 17; 16/231, 337, 354

[56] References Cited

U.S. PATENT DOCUMENTS

| | | | |
|---|---|---|---|
| 1,358,710 | 11/1920 | Day | 16/354 X |
| 1,686,406 | 10/1928 | Caplan | 70/223 |
| 1,930,651 | 10/1933 | Lyons et al. | 70/223 |
| 2,017,530 | 10/1935 | De Orlow | 70/223 |
| 2,210,186 | 8/1940 | Ross | 70/380 X |
| 2,497,328 | 2/1950 | Smith et al. | 70/223 X |
| 2,516,935 | 8/1950 | Weaver | 16/354 X |
| 2,587,781 | 3/1952 | Stanfield et al. | 16/337 X |
| 3,251,546 | 5/1966 | Rigo et al. | 70/360 X |
| 3,432,881 | 3/1969 | Putsch et al. | 16/354 X |
| 3,896,645 | 7/1975 | Nagy et al. | 70/223 X |
| 4,064,652 | 12/1977 | Johnston | 292/DIG. 17 X |
| 4,226,454 | 10/1980 | Tranberg et al. | 70/380 X |
| 4,384,744 | 5/1983 | Barley | 16/354 X |
| 4,483,162 | 11/1984 | Dunphy et al. | 70/380 X |
| 4,598,940 | 7/1986 | De Groat | 292/DIG. 17 X |
| 4,654,931 | 4/1987 | Sonneborn et al. | 16/337 |
| 4,759,204 | 7/1988 | Neyret | 70/360 |

FOREIGN PATENT DOCUMENTS 437054  6/1948  Italy ................. 70/379 R

Primary Examiner—Robert L. Wolfe
Assistant Examiner—Suzanne L. Dino
Attorney, Agent, or Firm—Cushman, Darby & Cushman

[57] ABSTRACT

A locking apparatus includes a following member secured to a pivotal axis, a braking piece capable of preventing the member from rotating in a first direction in a first position and of freeing the member in a second position, and a locking device having a tumbler body capable of engaging with the piece in the manner that the braking piece is in the first position when the locking device is in a locking state and when in an unlocking state, the tumbler body can urge the piece to be in the second position.

8 Claims, 3 Drawing Sheets

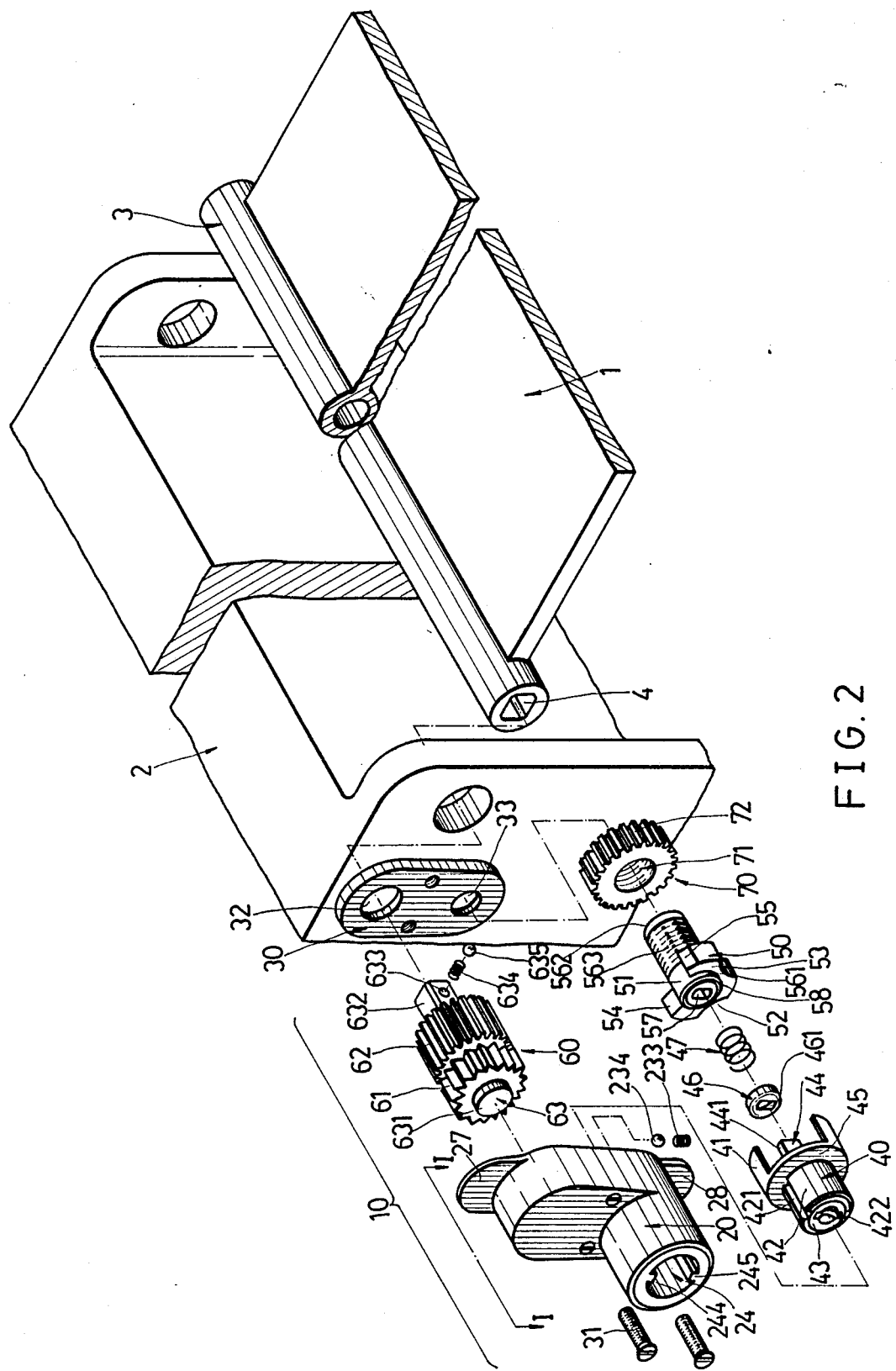

LOCKING APPARATUS

BACKGROUND OF THE INVENTION

The present invention relates to a locking apparatus, and more particularly to a locking apparatus for pivoting objects.

Pivoting hinged articles, e.g. doors are often locked after they are put in a closed position, by using the lock locking the door against the wall. Thus, the door and the wall cannot have in either direction a relative movement. In some circumstances, the pivoting article, however, may be desired to be locked only in one direction and thus a new locking apparatus for this purpose is required.

SUMMARY OF THE INVENTION

It is therefore an object of the present invention to provide a locking apparatus capable of locking a pivoting article only in one direction.

It is further an object of the present invention to provide a locking apparatus capable of automatically locking again after having been unlocked.

According to the present invention, a locking apparatus includes a following member secured to a pivotal axis of a first member, a braking piece capable of preventing the following member from rotating in a first direction in a first position and of freeing the following member in a second position, and a locking device having a tumbler body capable of engaging with the braking piece in the manner that the braking piece is in the first position when the locking device is in a locking state, and when in an unlocking state, the tumbler body can urge the braking piece to be in the second position.

Certainly, between the braking piece and the tumbler body, there can be provided a clutch mechanism which can include a spring retainer sliding on the tumbler body and a spring having two ends thereof respectively attached to the spring retainer and the braking piece so that when the tumbler body is not urged toward the braking piece, the spring will disengage the tumbler body from the braking piece.

Preferably the present apparatus further includes a housing secured to a second member with respect to which the first member pivots and housing therein the following member, the braking piece and the locking device.

Certainly, the following member can include a ratchet wheel and the braking piece can include a pawl to engage the ratchet wheel.

Certainly, the present apparatus can further include an intermediate piece mounted between the following member and the braking piece in order that when the locking device is unlocked and the first member is pivoted in the first direction to a predetermined position, the intermediate piece will urge the braking piece from the second position to the first position.

The following member can further include a gear to engage the intermediate piece which can be a gear having a threaded axial hole, and the braking piece can further include a threaded shaft portion meshing in the threaded axial hole.

The present invention may best be understood through the following description with reference to the accompanying drawings, in which:

BRIEF DESCRIPTION OF THE DRAWINGS

FIG. 2 is an exploded view showing a locking apparatus according to the present invention;

DETAILED DESCRIPTION OF THE PREFERRED EMBODIMENT

Figure 1:
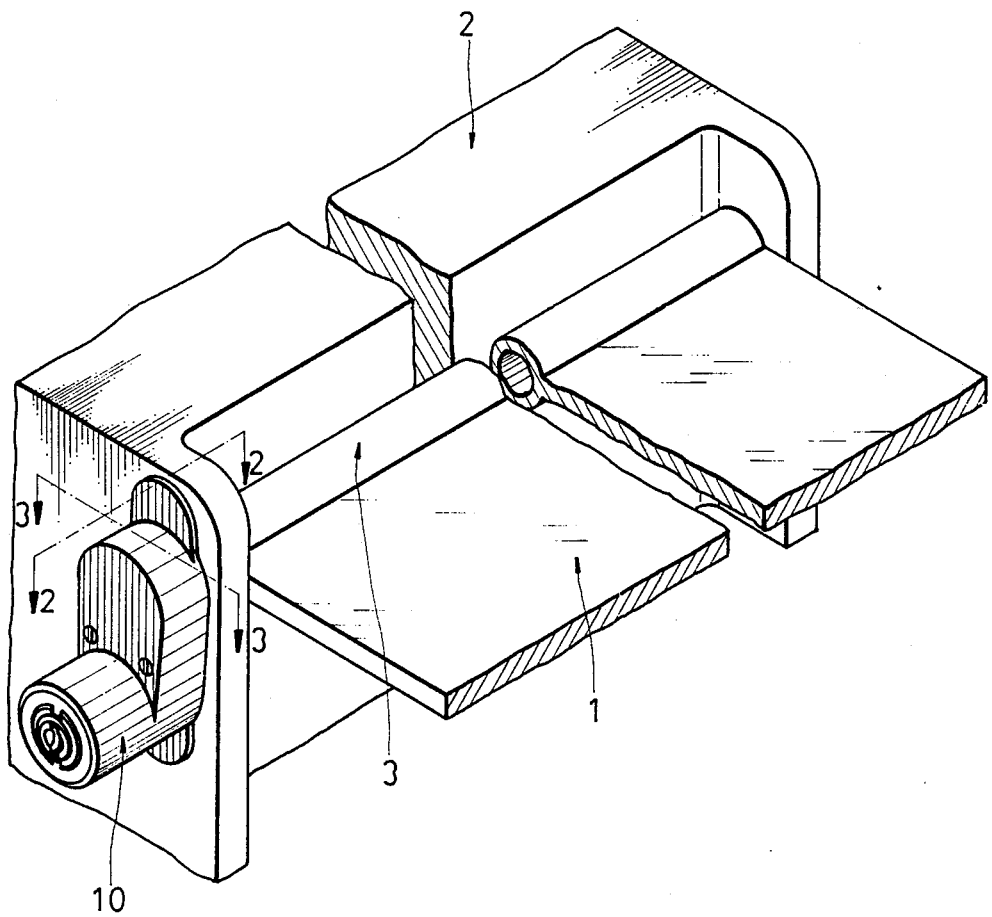
FIG. 1 is a perspective view showing a locking apparatus of the present invention in operation.

Referring now to FIGS. 1-6, the present locking apparatus 10 includes a housing 20, a cover plate 30, a locking device 40, a braking piece 50, a following member 60 secured to a pivotal axis 3 of a first member 1 vertically pivoting with respect to a second member 2, and an intermediate piece 70. Housing 20 includes an elliptical portion 21 having a gourd-shaped receiving room 23 and a laterally extending tubular portion 22 having a through hole 24 communicating with receiving room 23.

Locking device 40 has a portion of larger diameter 41 and a portion of smaller diameter 42 receiving therein a tumbler body 43 having an extension 44 having a free end 441 of rectangular cross-section. Portion 42, after being inserted into through hole 24, has two keyways 421, 422 thereof respectively engaged with two keys 244, 245 of through hole 24 which further includes a portion 241 of smaller diameter and a portion 242 of larger diameter which together form therebetween a shoulder portion 243 matching against another shoulder portion 45 formed between portions 41 and 42.

Braking piece 50 is a shafted annulus which includes an annulus having a blank section 51 defined by two ratchet pawls 54, 55 and two arcuate indents 52, 53, and a shaft 56 having two ends 561, 562 and an intermediate threader portion 563 with end 561 provided with a rectangular hole 57 and an annular groove 58. Braking piece 50 is to be positioned in the lower portion 231 of receiving room 23 in a way that rectangular hole 57 is aligned with extension end 441. Between extension end 441 and end 561, there is provided with a clutch mechanism which includes a spring retainer 46 having a rectangular hole 461 engaging therein extension end 441, and a spring 47 having two ends thereof respectively retained in spring retainer 46 and annular groove 58 so that when tumbler body 43 is urged toward end 561 to force retainer 46 to compress spring 47, extension end 441 can engage together with rectangular hole 57 and when tumbler body 43 is released by the respective key, spring 47 will expand to restore tumbler body 43 to its original position. In order that braking piece 50 can only rotate within a predetermined angle range and can oscillate within a small angle only when braking piece 50 is force-applied in a specific direction, lower portion 231 is provided with a recess 232 receiving therein a spring 233 and a ball 234 urging against arcuate indent 52 or 53.

Figure 6:
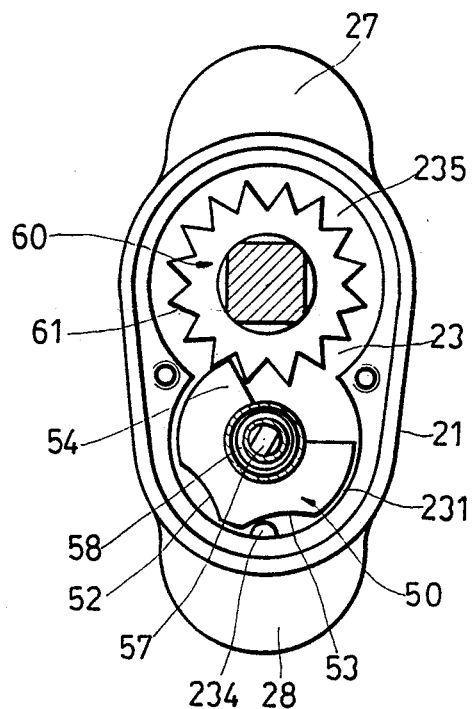
FIG. 6 is a sectional view taken along line 3—3 in FIG. 1.
Figure 4:
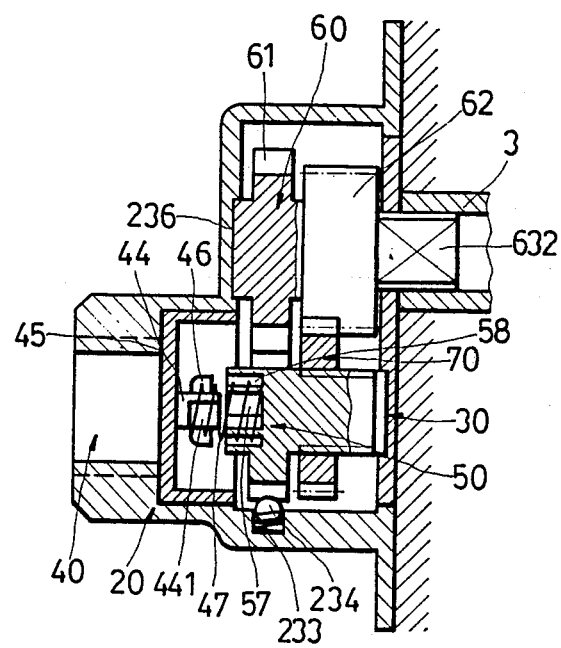
FIG. 4 is a sectional view, taken along line 2—2 in FIG. 1, showing a tumbler body and a braking piece of the present locking apparatus in separation.
Figure 3:
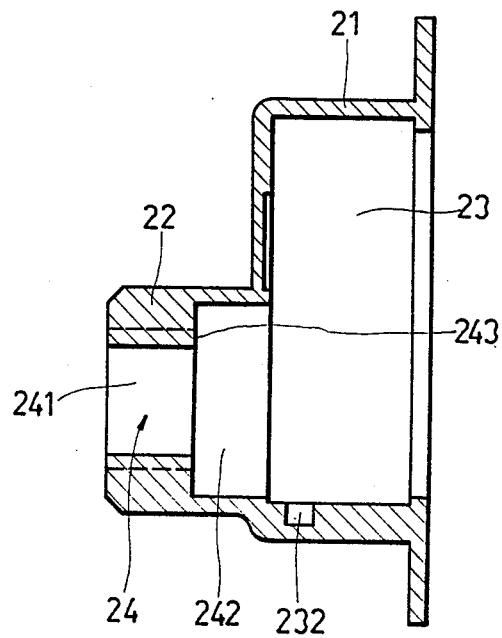
FIG. 3 is a sectional view, taken along line 1—1 in FIG. 2, showing a housing of the present locking apparatus.
Figure 5:
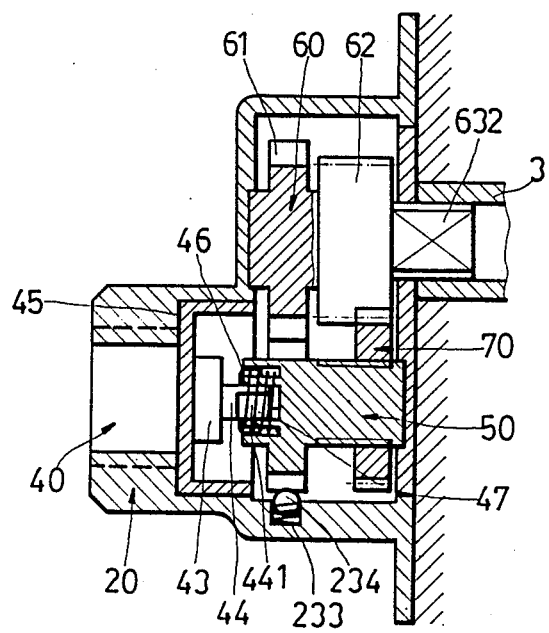
FIG. 5 is similar to FIG. 4 but shows the tumbler body and the braking piece therein engagement.

Following member 60 includes a ratchet wheel 61, a gear 62 and a shaft 63 having a circular end 631 and a rectangular end 632 provided with a recess 633 receiving therein a spring 634 and a ball 635 for easing the engagement and/or disengagement of end 632 into and/or from a rectangular hole 4 of pivotal axis (axle) 3. Following member 60 is to be located in the upper portion 235 of receiving room 23 with circular end 631 being rotatably mounted in a recess 236 formed on the wall of upper portion 235. When piece 50 is in a first position, as shown in FIG. 6, ratchet wheel 61 can only rotate in the clockwise direction. Upon clockwise rotating, braking piece 50 will oscillate within a small angle each time when each projection on ratchet wheel 61 engages across pawl 54.

Intermediate piece 70 is a gear 72 having a threaded axial hole 71 capable of meshing therein threaded portion 563 and engages with gear 62 in the manner that when locking device 40 is in an unlocking state, in which state piece 50 is moved to be in a second position (not shown) which frees ratchet wheel 61 to rotate in either a clockwise or counterclockwise direction, to enable first member 1 and ratchet wheel 61 to rotate counterclockwise, intermediate piece 70 is designed to screw on threaded portion 563 to bring piece 50 back to the first position. When first member 1 clockwise rotates, intermediate piece 70 will screw off threaded portion 563 but braking piece 50 still remains at the first position to lock ratchet wheel 61 from a counterclockwise rotation.

Cover plate 30 is elliptical and covered on receiving room 23 by bolts 31 and includes an upper hole 32 for passing therethrough rectangular end 632 and a lower hole 33 rotatably mounting therein end 562.

After the proper engagement among all of the above respective elements, two lugs 27, 28 of housing 20 are welded to second member 2. Certainly, any other suitable engaging procedure therebetween can alternatively be used.

The operation of the present locking apparatus 10 is as follows:

It is assumed that first member 1 can vertically pivot by 90° and is to be locked from a counterclockwise rotation. First, braking piece 50 is caused to be in the first position or locking device 40 is in the locking state so that ratchet wheel 61 is blocked from the counterclockwise rotation, i.e. first member 1 cannot upwardly pivot. When the respective key is inserted into tumbler body 43 to cause locking device 40 to be in an unlocking state, tumbler body 43 is used toward braking piece 50 in order that extension end 441 engages in rectangular hole 57 to turn braking piece 50 to the second position which frees ratchet wheel 61 to be able to rotate in either clockwise or counterclockwise direction. After the key is disengaged from tumbler body 43, spring 47 will disengage extension end 441 from rectangular hole 57. Since ratchet wheel 61 is freed, first member 1 can upwardly pivot with respect to second member 2. Upon the upward rotation of ratchet wheel 61, gear 62 will screw intermediate piece 70 on threaded portion 563 in the manner that when first member 1 is upwardly pivoted by 90°, intermediate piece 70 screws on threaded portion 563 to the largest extent and thus will bring brake piece 50 back to the first position which will lock ratchet wheel 61 from rotating counterclockwise after first member 1 has pivoted to its lowest position. In the course of the downward pivoting movement of first member 1, intermediate piece 70 is urged by gear 62 to be disengaged from threaded portion 563.

It can be noticed that the present locking apparatus 10 can have its shaft 63 connected to the pivotal axle of any article pivoting with respect to another article in order to control that the respective article can only pivot in one direction, for example, shaft 63 can be connected to the pivotal axle of the motorcycle stand so that after the motorcycle stands by the stand, the stand cannot be upwardly pivoted without a correct key.

It should now become apparent how and why the present invention can achieve the objects it contemplates.

What I claim is:

1. A locking apparatus comprising:
   a following member having a ratchet wheel and adapted to be secured to a pivotal axis of a first member pivoting with respect to a second member;
   a braking piece having at least a pawl engagable with said ratchet wheel for being capable of preventing said following member from rotating in a first direction in a first position and of freeing said following member in a second position; and
   a locking device mounted on said second member and having a tumbler body capable of engaging with said braking piece in a manner that said braking piece is in said first position when said locking device is in a locking state and when in an unlocking state, said tumbler body can urge said braking piece to be in said second position.

2. A locking apparatus according to claim 1, further comprising a clutch mechanism provided between said braking piece and said tumbler body.

3. A locking apparatus according to claim 2 wherein said clutch mechanism includes:
   a spring retainer sliding on said tumbler body; and
   a spring having two ends thereof respectively attached to said spring retainer and said braking piece so that when said tumbler body is not urged toward said braking piece, said spring will disengage said tumbler body from said braking piece.

4. A locking apparatus according to claim 1, further comprising a housing secured to second member and housing therein said following member, said braking piece and said locking device.

5. A locking apparatus according to claim 1, further comprising an intermediate piece mounted between said following member and said braking piece in order that when said locking device is unlocked and said first member is pivoted in said first direction to a predetermined position, said intermediate piece will urge said braking piece from said second position to said first position.

6. A locking apparatus according to claim 5 wherein said following member further includes a gear engagable with said intermediate piece.

7. A locking apparatus according to claim 6 wherein said braking piece further includes a threaded shaft portion.

8. A locking apparatus according to claim 7 wherein said intermediate piece is a gear having a threaded axial hole meshing therein said threaded shaft portion.

* * * * *